Oct. 29, 1935.   H. A. WAGNER   2,018,770
APPARATUS FOR ALIGNING VEHICLES WITH REFERENCE TO FIXED ROAD CONDITIONS
Filed Sept. 16, 1931   2 Sheets-Sheet 1
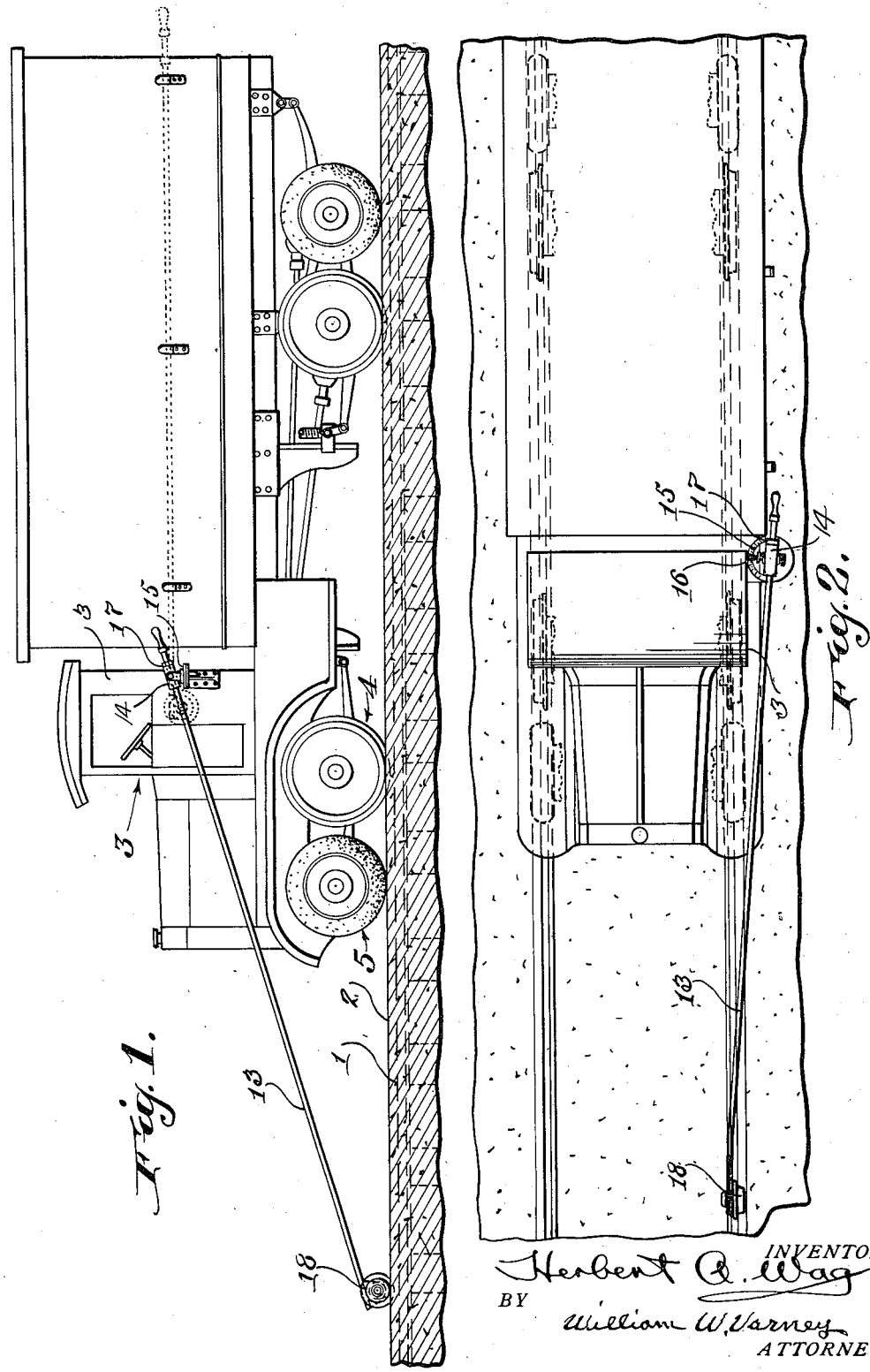

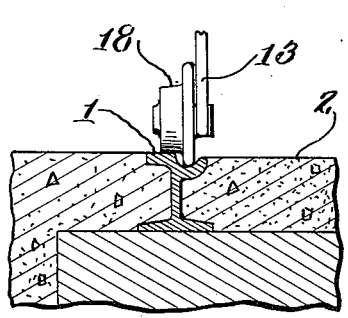
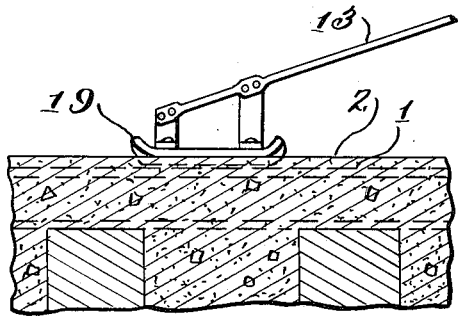
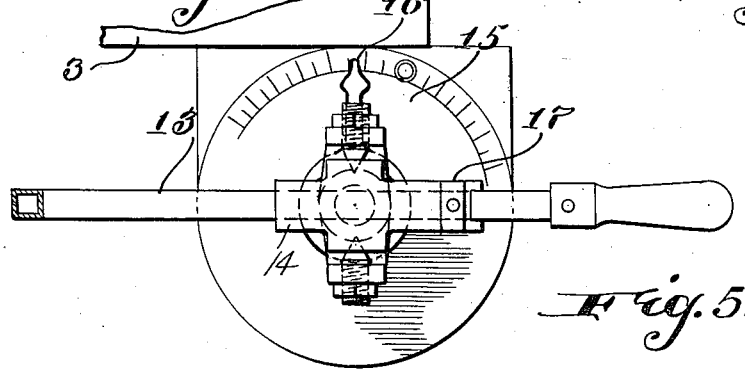
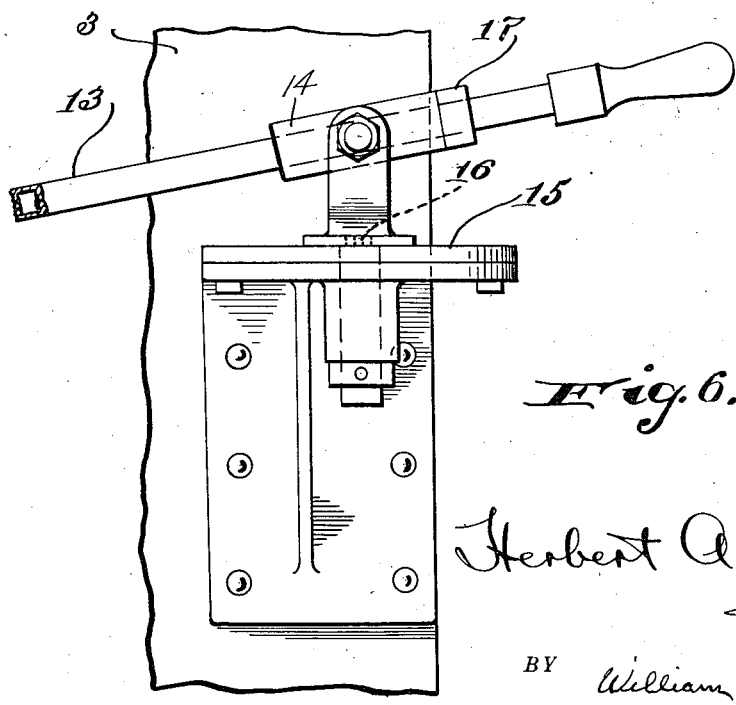

Patented Oct. 29, 1935

2,018,770

UNITED STATES PATENT OFFICE 2,018,770

APPARATUS FOR ALIGNING VEHICLES WITH REFERENCE TO FIXED ROAD CONDITIONS

Herbert A. Wagner, Chattolanee, Md.

Application September 16, 1931, Serial No. 563,054

2 Claims. (Cl. 116—28)

The object of my invention is to provide a system of transportation whereby passengers and freight may be conveyed from place to place between terminals located on ordinarily constructed highways, utilizing also for means of transportation the convenience and speed possibilities of fixed rail construction as a part of the connecting link between terminals.

In the above mentioned system, in passing from the public highway to the rail construction, it becomes necessary to properly align the vehicle with reference to the rails, the accomplishment of which is the object of this invention.

A further object of my invention is an improved system and means for aligning vehicles with reference to fixed road conditions.

A further object of my invention is the providing of apparatus for aligning vehicles with reference to the road upon which they travel.

With the foregoing and other objects in view, my invention consists of the apparatus and means as hereinafter specifically provided and illustrated in the accompanying drawings, wherein is shown the preferred embodiment of my invention, but it is understood that changes, variations and modifications may be resorted to which come within the scope of the claims hereunto appended.

In the drawings of the herein described apparatus containing my invention, Fig. 1 is a side view in elevation of a vehicle adapted to run on public highways, or on railway construction, at the will of the operator, and provided with my improvements; Fig. 2 is a plan view of the vehicle shown in Fig. 1 and positioned over the rails upon which it may operate; Fig. 3 is an enlarged view of a cross-section of the rail construction upon which the vehicle is to operate, showing the pointer trolley operating on the rail. Fig. 4 is an enlarged view of a section of the track in elevation showing a modified form of the pointer head wherein the trolley is replaced with a shoe; for some services, the shoe is preferable to the trolley. Fig. 5 is an enlarged plan view of the dial and pointer, the observation of which informs the operator when his truck wheels on one side of the vehicle are in alignment with the pointer resting in the track. Fig. 6 is a side view in elevation of the pointer and dial shown in Fig. 5.

Similar numerals refer to similar parts throughout the several views.

1 is the ordinary railroad track construction. 2 is the ordinary highway construction. 3 is a vehicle, and 4 are standard railway wheels. 5 are the resilient tired wheels.

Referring to Figs. 1–6, no sighting is required; in fact, the aligning of the vehicle may be accomplished in the dark by simply feeling the pointer with reference to the zero mark on the dial.

I will now proceed to describe this.

13 is a pointer rod operating through sleeve 14 through which it slides when not in use, and is stored alongside the vehicle as shown in dotted lines, in Fig. 1. Sleeve 14 is mounted in a trunnion in a Y operative over dial 15 and has attached to it indicator or pointer 16. On dial 15 is a zero mark, over which indicator or pointer 16 operates, and when they are together the end of pointer rod 13 and the rail wheels of the vehicle are in alignment. The pointer itself is not necessarily in alignment so far as the rod itself is concerned, as the definite position of the rod when in extreme out position determined by stop 17 gives a definite location of the end of the pointer rod.

On the end of pointer rod 13 is a trolley wheel 18, or a sliding shoe 19. Pointer rod 13 is preferably square or of some irregular shape, or is provided with a spline to insure the proper positioning of the trolley wheel or slide in the shoe; in other words, to prevent its turning over.

The operation of aligning a vehicle with the rails by means of the pointer rod is as follows:

The rod is slipped through the sleeve 14 from its position shown in dotted lines in Fig. 1 into the position shown in full lines, and is swung by the operator across the bed of the street through the slush or fog until it is located against the flange of the rail. Its relative position may be determined by the pointer and zero mark on the dial. The vehicle must continue in forward motion until the indicator or pointer and zero mark on the dial are in alignment or register and no movement is detected upon a further progressive movement of the vehicle. The operator is then assured that his running gear and the rails are in alignment and parallel.

In Fig. 1, an outline of the vehicle provided with means for relatively changing the wheels with reference to the rail, and with reference to each other so that the flanged wheels or the resilient tired wheels may be operative, is shown. The details are omitted, as they are shown and described in detail in my prior Patent No. 1,801,469.

Having thus described my invention, what I claim and desire to secure by Letters Patent is:

1. In a car equipped to operate both on rails and on highways, indicating means attached thereto for indicating the alignment of all the wheels of said car adapted to operate on said rails with reference to said rails, consisting of an arm carrying a tracer, means pivotally mounting said arm on the car, said arm and said mounting means including means for indicating when said tracer is in the vertical plane of the car wheels on one side of the car.

2. In an apparatus for aligning vehicles, as described in claim 1, said mounting means for said arm comprising a carrying member slidably mounted with reference to said arm whereby said arm may be moved therein for storing purposes on said vehicle when not in use.

HERBERT A. WAGNER